US011767657B2

(12) United States Patent
Shiina

(10) Patent No.: US 11,767,657 B2
(45) Date of Patent: Sep. 26, 2023

(54) CONSTRUCTION MACHINE

(71) Applicant: Hitachi Construction Machinery Co., Ltd., Tokyo (JP)

(72) Inventor: Takeshi Shiina, Ibaraki (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 442 days.

(21) Appl. No.: 17/272,838

(22) PCT Filed: Nov. 1, 2019

(86) PCT No.: PCT/JP2019/043077
§ 371 (c)(1),
(2) Date: Mar. 2, 2021

(87) PCT Pub. No.: WO2020/188873
PCT Pub. Date: Sep. 24, 2020

(65) Prior Publication Data
US 2021/0270014 A1    Sep. 2, 2021

(30) Foreign Application Priority Data

Mar. 18, 2019    (JP) .................................. 2019-049600

(51) Int. Cl.
*E02F 9/24*    (2006.01)
*E02F 9/26*    (2006.01)
*E02F 9/20*    (2006.01)

(52) U.S. Cl.
CPC .............. *E02F 9/2066* (2013.01); *E02F 9/24* (2013.01); *E02F 9/26* (2013.01)

(58) Field of Classification Search
CPC .............. E02F 9/2066; E02F 9/24; E02F 9/26
(Continued)

(56) References Cited

U.S. PATENT DOCUMENTS

| 2010/0277121 A1* | 11/2010 | Hall .................. H02J 50/90 320/108 |
| 2011/0303310 A1* | 12/2011 | Klicpera .............. B05B 12/008 137/551 |
| 2019/0218752 A1 | 7/2019 | Fukuo et al. |

FOREIGN PATENT DOCUMENTS

| JP | 2014-141223 A | 8/2014 |
| JP | 5836405 B2 | 12/2015 |

(Continued)

OTHER PUBLICATIONS

International Search Report (PCT/ISA/210) issued in PCT Application No. PCT/JP2019/043077 dated Dec. 10, 2019 with English translation (three (3) pages).

(Continued)

*Primary Examiner* — Colby M Hansen
(74) *Attorney, Agent, or Firm* — Crowell & Moring LLP

(57) ABSTRACT

To provide a technique where a case of shutting off a battery shutoff switch while a key switch is on is detected, and a warning according to a risk can be issued at time of restart. A construction machine includes: the key switch, an engine start switch, an engine stop switch, a notification device, a controller, and the battery shutoff switch. The controller chronologically stores operation histories of the key switch, engine start switch, and engine stop switch in a history storage section in a non-volatile manner. The controller determines, on the basis of the stored operation history, a risk content in a case of shutting off the battery shutoff switch while the key switch is on. In a case where, the controller is restarted by resuming the battery shutoff switch and turning on the key switch, the controller controls the notification device so that the notification device issues a warning according to the risk content, on the basis of a result of the determination.

5 Claims, 5 Drawing Sheets

(58) Field of Classification Search
USPC .......................................................... 701/54
See application file for complete search history.

(56) References Cited

FOREIGN PATENT DOCUMENTS

JP          6443423 B2    12/2018
WO    WO 2018/070245 A1   4/2018

OTHER PUBLICATIONS

Japanese-language Written Opinion (PCT/ISA/237) issued in PCT Application No. PCT/JP2019/043077 dated Dec. 10, 2019 (five (5) pages).

* cited by examiner

CONSTRUCTION MACHINE

TECHNICAL FIELD

The present invention relates to a battery shutoff warning of a construction machine.

BACKGROUND ART

The construction machine is provided with a battery shutoff switch which enables manual stop control so as to prepare for occurrence of malfunctions or the like of the machine. In a case where the battery shutoff switch is operated, power supply to all the devices and electronic devices in the construction machine is stopped at once. Hence, the battery shutoff switch involves risks of data disappearance and breakage of electronic components such as controller.

Patent literature 1 discloses the following construction machine as a technique related to the battery shutoff switch for use in the construction machine. This construction machine includes a sensor for determining whether or not a predetermined operation necessary for operating the battery shutoff switch is performed. The construction machine issues the warning in a case where a key switch is off, the battery shutoff switch is in a power supply mode, the controller is in operation, and the predetermined operation is performed.

CITATION LIST

Patent Literature

Patent literature 1: Patent Publication No. 6443423

SUMMARY OF INVENTION

Technical Problem

Patent Literature 1 pertains to a technique where with the key switch turned off, the controller determines whether or not an action to operate the shutoff switch is taken as the predetermined operation during a period from the turn-off of the key switch to the completion of a shutdown procedure of a control program, and then issues a warning. However, in the event of an erroneous motion of a vehicle due to the malfunction of some electronic device or the like, for example, an operator may sometimes stop the vehicle by turning off the battery shutoff switch while the key switch is on, ignoring a predetermined operation procedure or alarm content. Unlike the key switch disposed in a cab, the battery shutoff switch is disposed outside the vehicle so as to permit another person outside the vehicle to operate the vehicle even in an event where the operator in the cab has lost consciousness. Accordingly, there may be a case where one person cannot check at a time how the switch in the cab is operated and how the battery shutoff switch is operated.

An engine start switch and an engine stop switch are of a momentary type which is on while the button is depressed and is off when the button is released. It is therefore impossible to check operation histories of these switches retroactively.

Further, Patent Literature 1 does not teach a technique where at the emergency stop of the vehicle by turning off the battery shutoff switch, immediately preceding operation histories of the other switches are stored so as to warn the operator restarting the vehicle about what kind of risk is brought about by turning off the battery shutoff switch.

Further, Patent Literature 1 just describes the operations after turning off the key switch but does not consider a situation where the vehicle is stopped by operating the battery shutoff switch while the key switch is on.

Here, the risk associated with the operation of the battery shutoff switch is described. First, mention is made of a risk associated with power-off brought about by operating the battery shutoff switch while the engine is running. While the engine is in inertial rotation, an alternator rotates, too. However, if the power-off is brought about by means of the battery shutoff switch while the alternator is rotating, electric current produced by the rotating alternator causes surge current flow through the alternator or an electronic device in direct connection with the battery. This may result in blowout of a fuse or breakage of the electronic components.

Further, a description is made on the risk associated with the power-off brought about by means of the battery shutoff switch while the key switch is on (engine stop state before engine start-up or after engine shut-off). The above-described problem does not occur because the engine is rotating. However, if the power supply is shut off by the battery shutoff switch, the power supply to the controller is shutoff before an in-vehicle controller executes a shutdown procedure. This may result in the breakage of the controller. Further, a processing of recording data on a memory of the in-vehicle controller by storing the data in the storage is not executed so that the controller fails to save the data.

After the battery shutoff switch is operated, the operator who is restarting the machine must be informed that there are various risks according to different combinations of the switch operations as described above.

Accordingly, the present invention has been made in view of the foregoing, and an object of the present invention is to provide a technique where the case of shutting off the battery shutoff switch while the key switch is on is detected, and different warnings according to the different risks can be issued at the time of restarting the machine.

Solution to Problem

According to a typical aspect of the present invention for achieving the above objects, a construction machine includes: a key switch for switching a state of power supply to an engine controller for controlling an engine; an engine start switch and an engine stop switch as switches which send a command to start the engine and a command to stop the engine to the engine controller; a notification device; a controller which operates on electric power supplied from a battery, receives signals outputted from the key switch, the engine start switch, and the engine stop switch, and is connected to the notification device; and a battery shutoff switch for shutting off the power supply from the battery to the engine controller, the notification device, and the controller, wherein the controller includes a history storage section which receives the signal outputted by operating the key switch, the engine start switch, or the engine stop switch, and chronologically stores operation histories of the individual switches in the history storage section in a non-volatile manner, and the controller determines, on the basis of the operation history stored in the history storage section, a risk content in a case of shutting off the battery shutoff switch while the key switch is on, and in a case where the controller is restarted by resuming the battery shutoff switch and turning on the key switch, the controller provides control so that the notification device issues a warning according to the risk content, on the basis of a result of the determination.

Advantageous Effects of Invention

According to the present invention, the operation history in a case of shutting off the battery shutoff switch while the key switch is on is stored so that the warning can be issued according to the risk after the machine is restarted. The other objects, configurations and effects than those described above will become apparent from the following description of the embodiment.

DESCRIPTION OF EMBODIMENT

Figure 1:
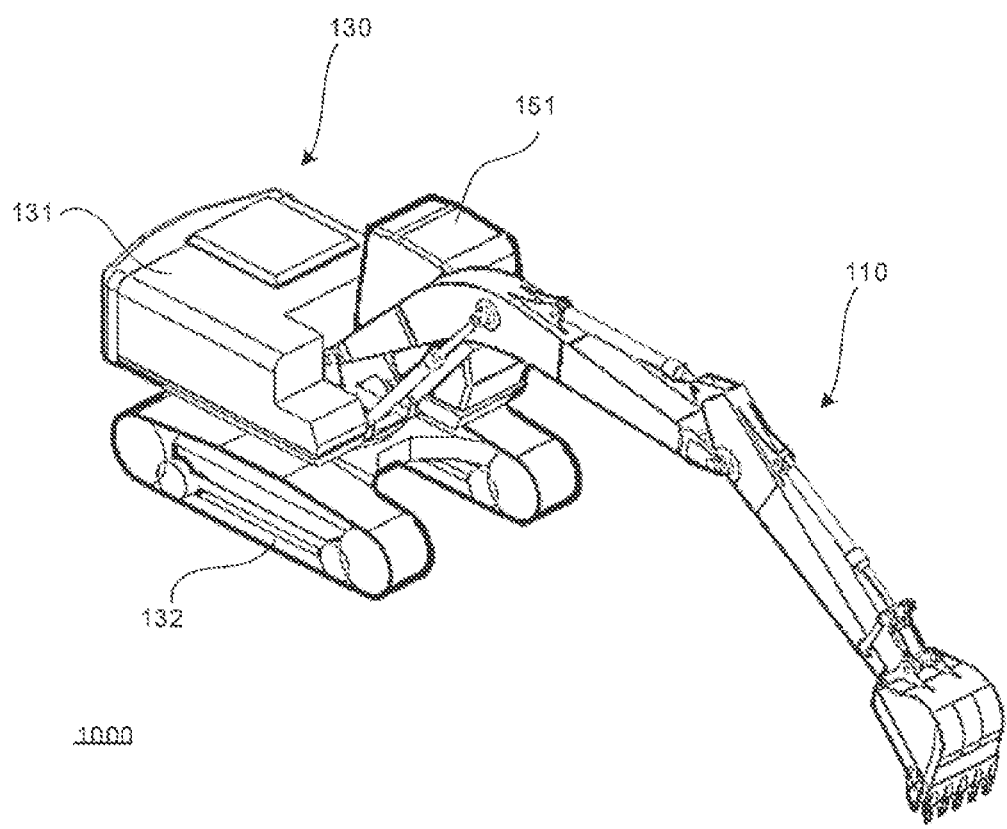
FIG. 1 is a perspective view schematically showing a configuration of a hydraulic excavator according to an embodiment.

A construction machine according to the embodiment will hereinbelow be described with reference to the accompanying drawings. This embodiment illustrates a hydraulic excavator as the construction machine. FIG. 1 is a perspective view showing an overview of the hydraulic excavator according to the embodiment.

Figure 2A:
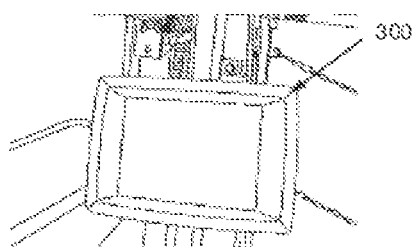
FIGS. 2A to 2C are a set of diagrams showing an interior of a cab and a switch arrangement of the hydraulic excavator according to the embodiment.
Figure 2B:
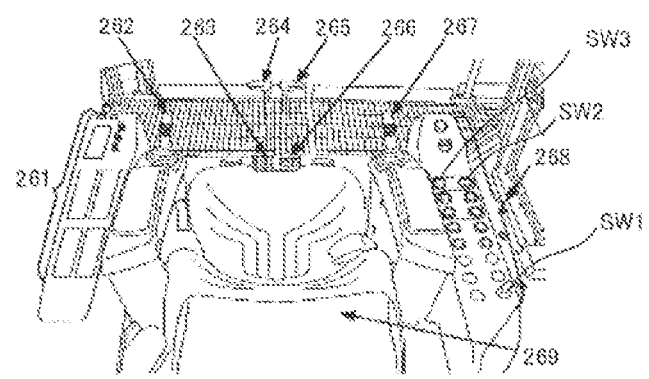

A hydraulic excavator 1000 includes an articulated front work machine 110 and a vehicle 130. The vehicle 130 includes an upperstructure 131 and an undercarriage 132. The upperstructure is provided with a cab 151 where an operator operates the hydraulic excavator 1000. FIG. 2(A) and FIG. 2(B) illustrate an interior of the cab 151.

A display monitor 300 (notification device) having a touch panel formed on a front side thereof is disposed at place upward of a front side of the cab 151. The display monitor 300 receives an input from the operator by way of a touch panel function and gives a variety of information to the operator. The display monitor 300 also functions as a meter panel for displaying information necessary for the operation of the hydraulic excavator 1000.

A left console 261 and a right console 268 are disposed at lateral sides of an operator seat 269. The operator seat is further provided with control levers 262, 267 used by the operator for controlling a swing motion of the upperstructure 131 and motions of the articulated front work machine 110. Travel control levers 264, 265 and travel control pedals 263,266 which are used by the operator for controlling a travelling motion of the undercarriage 132 are disposed on a front side of the operator seat 269.

Figure 2C:
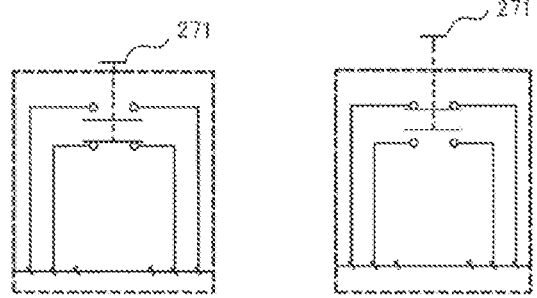

The right console 268 is provided with a key switch SW1, an engine start switch SW2, and an engine stop switch SW3. The key switch SW1 is a switch for switching a state of power supply to an engine controller 3 (see FIG. 4) controlling an engine 4 (see FIG. 4). The engine start switch SW2 and the engine stop switch SW3 are switches for sending a command to start the engine 4 and a command to stop the engine to the engine controller 3. The engine start switch SW2 and the engine stop switch SW3 are push-button type switches. In a case where a push operation is performed as shown in FIG. 2(C), a button operation section 271 is moved downward to start or stop the engine. In a case where the switch is released, the button operation section 271 is returned to its original position. Thus, the engine start switch SW2 and the engine stop switch SW3 are the momentary type switches which are returned when released.

Figure 3A:
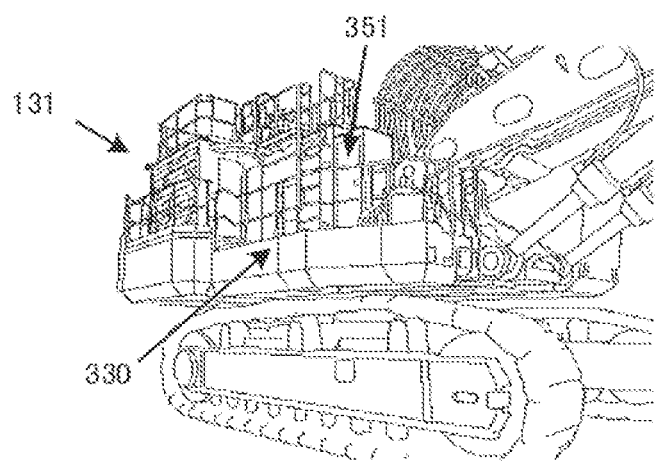
FIGS. 3A to 3C are a set of diagrams illustrating a battery shutoff switch according to the embodiment.
Figure 3B:
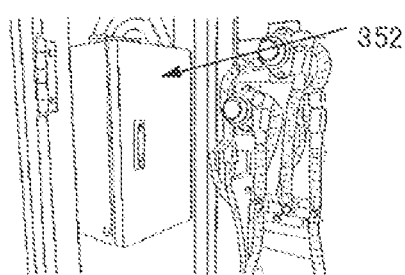
Figure 3C:
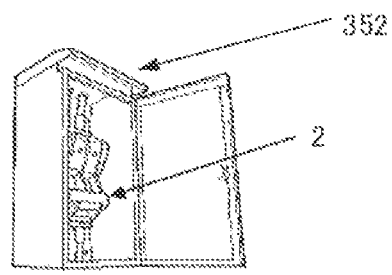

FIG. 3 is a set of diagrams illustrating a battery shutoff switch according to the embodiment. As shown in FIG. 3(A), for example, a battery shutoff switch 2 is disposed in a battery box 351 on a deck 330 of the upperstructure 131. In a case where the battery box 351 is opened, a battery shutoff switch box 252 is inside the battery box. The battery shutoff switch 2 is accommodated in this battery box (see FIGS. 3(B) and 3(C)). The battery shutoff switch 2 is connected in series with a battery 1 (see FIG. 4). The connection to the battery 1 can be switched between on and off by the operator moving up or down the lever. Particularly an engine start switch for sending a command to start the engine to the engine controller, and an engine stop switch for sending a command to stop the engine to the engine controller a supersized excavator such as mining excavators, a configuration is so made as to permit manual stop control in the event of a machine malfunction. In a case where the operator turns off the battery shutoff switch 2, the power supply to all the devices and electronic devices in the hydraulic excavator 1000 is instantaneously stopped.

Figure 4:
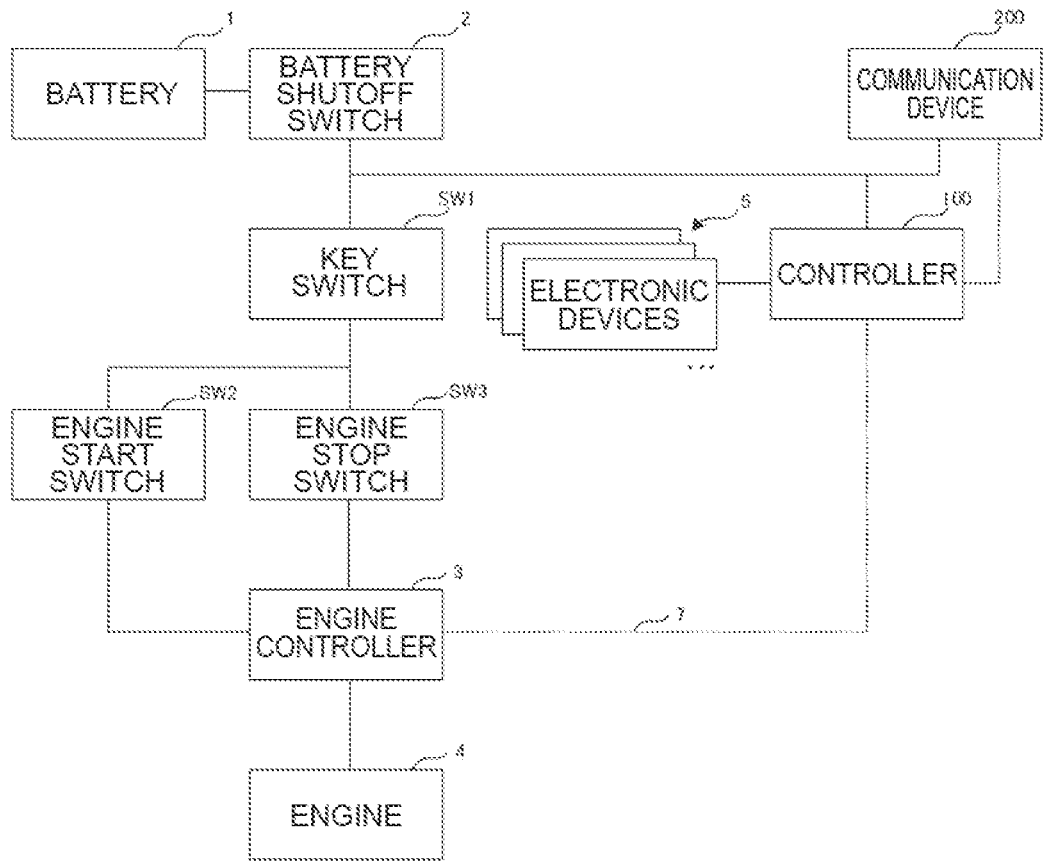
FIG. 4 is a block diagram showing a configuration of the hydraulic excavator according to the embodiment.
Figure 5:
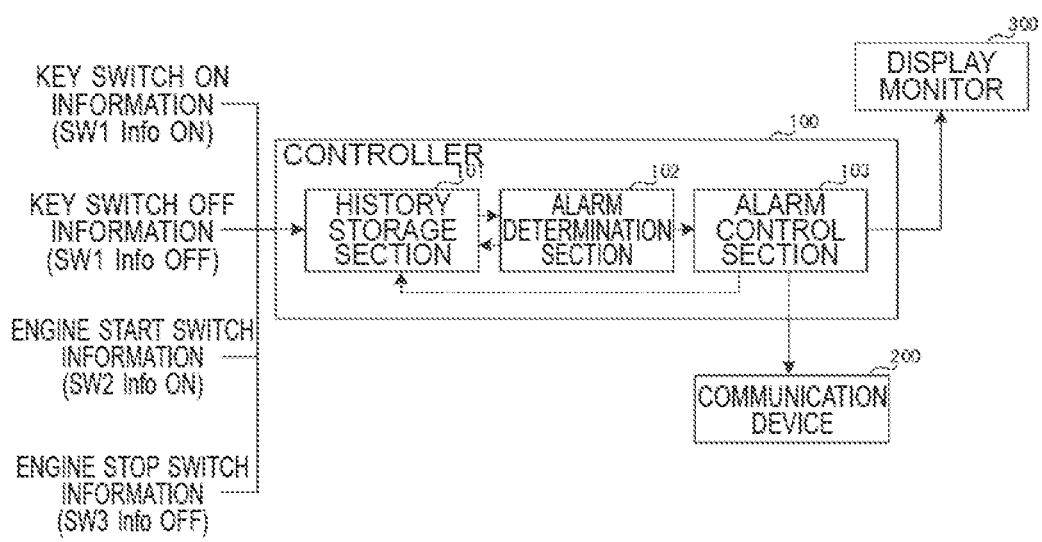
FIG. 5 is a block diagram showing a control system configuration according to the embodiment.

FIG. 4 is a diagram showing a configuration of the hydraulic excavator 10. FIG. 5 is a control block diagram of a controller 100 shown in FIG. 4.

As shown in FIG. 4, the hydraulic excavator 1000 includes the battery 1, the above-described battery shutoff switch 2, the key switch SW1, the engine start switch SW2, and the engine stop switch SW3. The battery shutoff switch 2 shuts off the power supply from the battery 1 to the engine controller 3, the display monitor 300, a communication device 200, and the controller 100.

The hydraulic excavator 1000 includes the engine controller 3 which controls the engine 4 according to operation statuses of the key switch SW1, the engine start switch SW2, and the engine stop switch SW3.

The hydraulic excavator 1000 further includes the controller 100 which controls the operations of the hydraulic excavator 1000. The controller 100 operates on the power supplied from the battery 1. The controller 100 receives signals outputted from the key switch SW1, the engine start switch SW2, and the engine stop switch SW3 and is also connected to the display monitor 300 and the communication device 200.

The controller 100 includes: the communication device 200 (notification device) for transmitting a state of the hydraulic excavator 1000 to an external server and the like; a communications line 7 responsible for bidirectional communications of vehicle information between the controllers; and other electronic devices 5.

The controller 27 is a computer which includes: a CPU (Central Processing Unit); a RAM (Random Access Memory) as a temporary data storage space for working data; a ROM (Read Only Memory) storing a control program executed by the controller 100; a storage (memory device) constituted by, for example, a flash memory and capable of storing data in a non-volatile manner; an external I/F (Interface); and the like, and in which these components are interconnected by means of buses. As shown in FIG. 5, the controller 100 can be divided into functional blocks which includes: a history storage section 101; an alarm determination section 102; and an alarm control section 103.

The history storage section 101 is the above-described non-volatile storage, receiving a signal outputted in response to the operation of the key switch SW1, engine start switch SW2, or engine stop switch SW3.

The history storage section 101 stores a history of events (history of operations by the operator) occurred in the vehicle of the hydraulic excavator 1000 in a chronological order. The history storage section 101 stores the events as matching time information such as date and time of occurrence of the related event against the content thereof. Out of the histories of events occurred in the vehicle of the hydraulic excavator 1000, operation histories of the respective key switch SW1, engine start switch SW2, and engine stop switch SW3 are hereinafter described as a processing object.

On the basis of the operation histories stored in the history storage section 101, the alarm determination section 102 determines a risk content in a case of shutting off the battery shutoff switch 2 while the key switch is on. In a case where the controller 100 is restarted by resuming the battery shutoff switch 2 from an off-state (shut-off position) to an on-state, the alarm determination section 102 retrieves history information stored in the history storage section 101, and retroactively determines the order of operations of the key switch SW1, engine start switch SW2, and engine stop switch SW3 from the related history information. For example, the alarm determination section 102 can determine whether or not the vehicle was stopped by means of the battery shutoff switch 2 while the engine was running.

The alarm control section 103 issues a warning to the operator by displaying the warning on the display monitor 300. Upon acquiring a result of determination from the alarm determination section 102, resuming the battery shutoff switch 2 based on a result of the determination, and restarting the controller 100 by turning on the key switch, the alarm control section 103 provides control so that the display monitor 300 issues a warning according to the risk content.

In a case where the operator turns on the key switch SW1, an on signal of the key switch SW1 is outputted to the engine controller 3 so that the engine 4 can be started. This on signal is also outputted to the controller 100 as key switch on information (SW1 Info ON), and is stored in the history storage section 101 along with information on the date and time of command execution.

In a case where the engine start switch SW2 is turned on by turning on the key switch SW1, an on signal of the engine start switch SW2 is outputted to the engine controller 3 so that the engine 4 is started. This on signal is also outputted to the controller 100 as engine start switch information (SW2 Info ON) and is stored in the history storage section 101 along with information on the date and time of command execution.

In a case where the operator, finished with field operation, turns on the engine stope switch SW3, an on signal of the engine stop switch SW3 is outputted to the engine controller 3 so as to stop the engine 4. This on signal is also outputted to the controller 100 as engine stop switch information (SW3 Info ON) and is stored in the history storage section 101 along with information on the date and time of command execution.

Subsequently in a case where the operator turns off the key switch SW1, a key switch SW1 off signal is outputted to the engine controller 3. This key switch SW1 off signal is also outputted to the controller 100 as key switch off information (SW1 Info OFF) and is stored in the history storage section 101 along with information on the date and time of command execution. Incidentally, once the key switch SW1 is turned off, the engine 4 is not started despite the operator's operation of turning on the engine start switch SW2.

As above, in a case where the engine of the construction machine is started and then stopped according to a regular procedure, the following events are stored in the history storage section 101 of the controller 100 in the chronological order:

1. key switch on information (SW1 Info ON)
2. engine start switch information (SW2 Info ON)
3. engine stop switch information (SW3 Info OFF)
4. key switch off information (SW1 Info OFF)

Conversely in a case where the key switch SW1 is turned on, followed by turning on the engine start switch SW2 and then, the vehicle is stopped by shutting off the battery shutoff switch 2 while the engine is running, "key switch on information (SW1 Info ON)" and "engine start switch information (SW2 Info ON)" are stored in the history storage section 101 of the controller 100 in the non-volatile manner because these switches were operated before shutting off the battery shutoff switch 2. However, the other information "engine stop switch information (SW3 Info ON)" and "key switch off information (SW1 Info OFF)" is not stored in the history storage section 101 of the controller 100.

Figure 6:
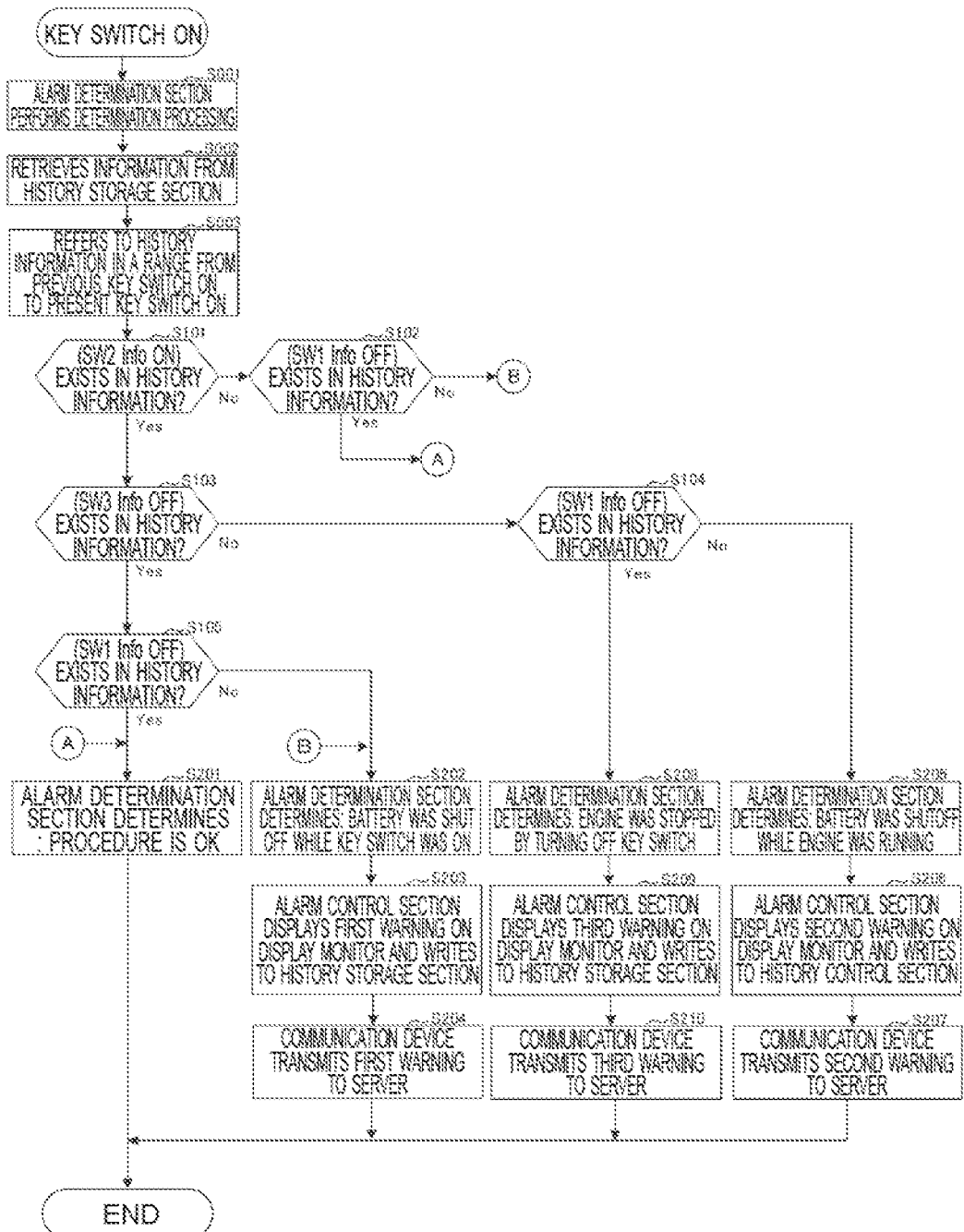
FIG. 6 is a flow chart showing exemplary steps of control operation according to the embodiment.

In accord with the foregoing description, control operations according to the embodiment are described with reference to FIG. 6.

In order to restart from a state where the power source is brought into an emergency cutout by means of the battery shutoff switch 2, the battery shutoff switch 2 is first returned to a power supply mode (on state). Subsequently, in a case where the operator turns on the key switch SW1 in the cab 151 of the hydraulic excavator 1000, the alarm determination section 102 starts processing (S001), retrieving the history information from the history storage section 101 (S002). The alarm determination section 102 sequentially refers to history information in the chronological order in a determination range from the previous key switch on information (SW1 Info ON) to the present key switch on information (SW1 Info ON) (S003).

First, a description is made on a case where it is determined that the hydraulic excavator 1000 was stopped according to the regular procedure. In a case where the engine start switch information (SW2 Info ON) exists in the determination range of the history information (hereinafter, simply referred to as "in the history information") (S101: Yes), the alarm determination section 102 determines whether the engine stop switch information (SW3 Info OFF) exists or not (S103).

In a case where the engine stop switch information (SW3 Info OFF) exists (S103: Yes), the alarm determination section 102 determines whether the key switch off information (SW1 Info OFF) exists or not (S105). In a case where the key switch off information (SW1 Info OFF) exists (S105: Yes), the alarm determination section 102 determines that the construction machine was stopped according to the regular procedure (S201) and terminates the processing.

In a case where it is determined in S101 that the engine start switch information (SW2 Info ON) does not exist (S101: No), then the alarm determination section 102 determines whether the key switch off information (SW1 Info OFF) exists or not (S102). In a case where the key switch off information (SW1 Info OFF) exists (S102: Yes), this is the case where the engine 4 was not started but only an operation of turning on or turning off the key switch was performed. Therefore, the alarm determination section 102 also handles this case as the construction machine stopped according to the regular procedure. Namely, in a case where the key switch off information (SW1 Info OFF) exists (S102: Yes), the alarm determination section 102 proceeds to S201 via a processing route A. Then, the alarm determination section 102 determines that the construction machine was stopped according to the regular procedure (S201) and terminates the processing. On the other hand, a case where the key switch off information (SW1 Info OFF) does not exist (S102: No) will be described hereinlater.

Next, a description is made on a case where it is determined that the vehicle was stopped by means of the battery shutoff switch 2 while the key switch was on.

In a case where it is determined in S101 that the engine start switch information (SW2 Info ON) exists (S101: Yes), the alarm determination section 102 determines whether the engine stop switch information (SW3 Info OFF) exists or not (S103). In a case where the engine stop switch information (SW3 Info OFF) exists (S103: Yes), the alarm determination section 102 determines whether the key switch off information (SW1 Info OFF) exists or not (S105).

In a case where the key switch off information (SW1 Info OFF) does not exist (S105: No), the alarm determination section 102 determines that the vehicle was stopped by means of the battery shutoff switch 2 while the key switch was on, and determines that there is an event involving one of a risk of operation data disappearance and a risk of controller breakage or both of these risks (S202). The alarm determination section 102 outputs, to the alarm control section 103, identification information according to the related risk content (here, the operation data disappearance and the controller breakage) as a determination result, along with an alarm command.

Upon receiving a result of the determination, the alarm control section 103 displays, on the display monitor 300, a first warning as information indicating the relevant risk content. The alarm control section also registers, with the history storage section 101, an event that the vehicle was stopped by means of the battery shutoff switch 2 while the key switch was on (S203). The alarm control section 103 transmits data including the identification information indicating the first warning to the external server via the communication device 200 (S204) and terminates the processing.

The first warning (battery shut off with the on-state key switch) displayed on the display monitor 300 reads as follows, for example. Besides the notification given by way of display, a spoken notification may also be given by means of a speaker incorporated in the display monitor 300. The following wording is just one example. "In the previous operation, the battery was shut off while the key switch was on. Please be sure not to perform such an operation again, because this operation involves the risk of operation data disappearance and the risk of controller breakage. Please be sure to turn off the key switch first before you shut off the battery." The display monitor 300 displays the first warning that warns against one of the risk of operation data disappearance and the risk of controller breakage or against both of the risks.

In a case where it is determined in S101 that the engine start switch information (SW2 Info ON) does not exist (S101: No), the alarm determination section 102 determines whether the key switch off information (SW1 Info OFF) exists or not (S102). In a case where the key switch off information (SW1 Info OFF) does not exist (S102: No), the alarm determination section 102 proceeds to S202 via a processing route B. Then, the alarm determination section 102 determines that the event involving one or both of the above-described risks of operation data disappearance and controller breakage has occurred because the vehicle was stopped by the means of the battery shutoff switch 2 while the key switch was on (S202). Upon receiving a result of the determination, the alarm control section 103 displays the first warning on the display monitor 300 and registers this this determination result with the history storage section 101 (S203). The alarm control section 103 transmits data including the identification information indicating the first warning to the external server via the communication device 200 (S204) and terminates the processing.

Next, a description is made on a case where it is determined that the vehicle was stopped by means of the battery shutoff switch 2 while the engine was running.

In a case where it is determined in S101 that the engine start switch information (SW2 Info ON) exists (S101: Yes), the alarm determination section 102 determines whether or not the engine stop switch information (SW3 Info OFF) exists in the history information (S103). In a case where the engine stop switch information (SW3 Info OFF) does not exist (S103: No), and where the key switch off information (SW1 Info OFF) does not exist (S104: No), the alarm determination section 102 determines that the vehicle was stopped by means of the battery shutoff switch while the engine was running, and then determines that there is an event involving one or both of a risk of breakage of the electronic component in the electronic device and a risk of blowout of the fuse (S205). The alarm determination section 102 outputs, to the alarm control section 103, the identification information according to the related risk content (here, the risk of breakage of the electric component in the electronic device and the risk of fuse blowout) as a result of the determination, along with the alarm command.

Upon receiving this determination result, the alarm control section 103 displays, on the display monitor 300, a second warning as information indicating the relevant risk content. Further, the alarm control section 103 also registers, with the history storage section 101, the event of stopping the vehicle by means of the battery shutoff switch while the engine was running (S206). The alarm control section 103 transmits data including the identification information indicating the second warning to the external server via the communication device 200 (S207) and terminates the processing.

The second warning (battery shut off with the engine running) displayed on the display monitor 200 reads as follows, for example. Besides the notification given by way of the display, the spoken notification may also be given by way of the speaker incorporated in the display monitor 300. The following wording is just one example. "In the previous operation, the battery was shut off while the engine was running. Please be sure not to perform such an operation again because this operation involves the risk of breakage of the electronic components in the electronic devices and the risk of fuse blowout. Please be sure to shut off the engine first, and then to turn off the key switch before you shut off the battery." As just described, the display monitor 300 displays the second warning that warns against one or both of the risk of the electronic component breakage and the risk of fuse blowout.

This embodiment is also adapted to detect a case where the engine 4 was stopped by using the key switch SW1 instead of the engine stop switch SW3. In a case where it is determined in S103 that the engine stop switch information (SW3 Info OFF) does not exist (S103: No) but that the key switch off information (SW1 Info OFF) exists (S104: Yes), the alarm determination section 102 determines that the engine 4 was not stopped by means of the engine stop switch SW3 but stopped by means of the key switch SW1 (S208). Then, the alarm control section 103, in turn, displays a third warning which is different from the first or second warning on the display monitor 300 and registers, with the history storage section 101, the case where the engine 4 was not stopped by means of the engine stop switch SW3 but stopped by means of the key switch SW1 (S209). The alarm control section 103 transmits information indicating the third warning to the external server via the communication device 200 (S210) and terminates the processing.

According to the embodiment, in a case where the operator is starting the vehicle after operating the battery shutoff switch 2, the vehicle can issue a restart-time warning about the previous vehicle stop time when the battery shutoff switch was shut off while the engine was running or the key switch was on. Further, the warning is displayed on the display monitor 300 so that the operator can learn what kind of risk is involved in the case where the vehicle is stopped by means of the battery shutoff switch 2. In addition, in a case where the vehicle is stopped by means of the battery shutoff switch 2, the communication device 200 transmits the relevant information to the external server. This permits a maintenance service worker of construction machine to focus on checking for any problem associated with the battery shutoff as well as to give guidance to the operator.

As described with reference to FIG. 2(C), the engine start switch SW2 and the engine stop switch SW3 have the momentary type button configuration where the button operation section 271 is returned to its original position when released. Therefore, in a case where the operator is starting to operate the vehicle, the operator cannot determine whether or not the engine 4 was shut down according to the regular procedure using the engine stop switch SW3, even though the operator checks for the individual switches SW2 and SW3. As suggested by the embodiment, for example, the third warning is displayed so as to allow the operator to know whether or not the engine was shut down according to the regular procedure.

In conclusion, the embodiment provides the following effects. In the case where the battery shutoff switch is shut off while the engine is running or the key switch is on, the risk content is determined by examining the operation histories (in combination) of the individual switches up to the time of shutting off the battery and then, the warning can be issued according to the relevant risk content.

REFERENCE SIGNS LIST

1: battery
2: battery shutoff switch
3: engine controller
4: engine
5: electronic device
7: communications line
100: controller
101: history storage section
102: alarm determination section
103: alarm control section
110: articulated front work machine
130: vehicle
131: upperstructure
132: undercarriage
151: cab
200: communication device
300: display monitor
1000: hydraulic excavator
SW1: key switch
SW2: engine start switch
SW3: engine stop switch

The invention claimed is:

1. A construction machine comprising:
a key switch for switching a state of power supply to an engine controller for controlling an engine;
an engine start switch for sending a command to start the engine to the engine controller, and an engine stop switch for sending a command to stop the engine to the engine controller;
a notification device;
a controller which operates on electric power supplied from a battery, receives signals outputted from the key switch, the engine start switch, and the engine stop switch, and is connected to the notification device; and
a battery shutoff switch for shutting off the power supply from the battery to the engine controller, the notification device, and the controller,
wherein in a case where the key switch is turned on, the key switch starts the controller by starting the power supply thereto, and
in a case where the key switch is turned off, the key switch shuts down the controller by stopping the power supply thereto,
the controller includes a history storage section which receives the signal outputted by operating the key switch, the engine start switch or the engine stop switch, and chronologically stores operation histories of the individual on-state switches in the history storage section in a non-volatile manner while the controller is running,
in a case where the controller is restarted by resuming the battery shutoff switch from a state of shutting off the power supply from the battery and turning on the key switch, the controller determines, on the basis of the operation history stored in the history storage section, a shut-off risk in a case of shutting off the battery shutoff switch while the key switch is on, and
the controller provides control on the basis of a result of the determination so that the notification device issues a warning indicting the shut-off risk.

2. The construction machine according to claim 1, wherein the controller refers to the operation history in a determination range from history information related to the previous turn-on of the key switch to history information related to the present turn-on of the key switch and makes determination on the basis of the operation history included in the determination range.

3. The construction machine according to claim 2, wherein in a case where the operation history of the engine stop switch exists in the determination range and where the operation history of turning off the key switch does not exist in the determination range, the controller provides control so that the notification device issues a first warning indicating the shut-off risk while the engine is shut down, and
in a case where the operation history of the engine stop switch does not exist in the determination range and where the operation history of turning off the key switch does not exist, the controller provides control so that the notification device issues a second warning indicating the shut-off risk while the engine is running.

4. The construction machine according to claim 3, wherein the notification device is a communication device for transmitting data to an external server, and the communication device transmits, to the external server, data including identification information indicating the first warning or data including identification information indicating the second warning.

5. The construction machine according to claim 3, wherein the engine stops in a case where the key switch is turned off, and in a case where the operation history of the engine stop switch does not exist in the determination range and where the operation history of turning off the key switch exists, the controller determines a stop risk in a case of stopping the engine by means of the key switch and provides control so that the notification device issues a third warning indicating the stop risk.

\* \* \* \* \*